United States Patent
Shibata et al.

(10) Patent No.: US 10,566,795 B2
(45) Date of Patent: Feb. 18, 2020

(54) METHOD FOR CONTROLLING STORAGE BATTERY SYSTEM

(71) Applicants: Tokyo Electric Power Company Holdings, Inc., Tokyo (JP); NGK Insulators, Ltd., Nagoya (JP)

(72) Inventors: Takayuki Shibata, Tokyo (JP); Youko Kimura, Tokyo (JP); Yoichiro Tashiro, Tokyo (JP); Masataka Kurokawa, Nagoya (JP)

(73) Assignees: Tokyo Electric Power Company Holdings, Inc., Chiyoda-Ku (JP); NGK Insulators, Ltd., Nagoya (JP)

( * ) Notice: Subject to any disclaimer, the term of this patent is extended or adjusted under 35 U.S.C. 154(b) by 171 days.

(21) Appl. No.: 15/901,262

(22) Filed: Feb. 21, 2018

(65) Prior Publication Data

US 2018/0183239 A1 Jun. 28, 2018

Related U.S. Application Data

(63) Continuation of application No. PCT/JP2016/070044, filed on Jul. 6, 2016.

(30) Foreign Application Priority Data

Aug. 26, 2015 (JP) .................................. 2015-166648

(51) Int. Cl.
*H02J 3/32* (2006.01)
*H02J 7/00* (2006.01)

(52) U.S. Cl.
CPC .............. *H02J 3/32* (2013.01); *H02J 7/0021* (2013.01)

(58) Field of Classification Search
CPC ...... H02J 3/32; H02J 7/0021; H02J 2007/005; H02J 2007/0067; H02J 7/0047; H02J 7/0063

See application file for complete search history.

(56) References Cited

U.S. PATENT DOCUMENTS

| 2014/0162091 A1* | 6/2014 | Hatta | H01M 10/3909 429/50 |
| 2014/0365027 A1* | 12/2014 | Namba | H02J 3/32 700/297 |
| 2016/0013676 A1* | 1/2016 | Kaji | H02J 3/32 320/134 |

FOREIGN PATENT DOCUMENTS

| JP | 2012-016077 A1 | 1/2012 |
| JP | 2012-130106 A1 | 7/2012 |

(Continued)

OTHER PUBLICATIONS

International Search Report and Written Opinion (Application No. PCT/JP2016/070044) dated Sep. 20, 2016.

*Primary Examiner* — Drew A Dunn
*Assistant Examiner* — Sailesh Thapa
(74) *Attorney, Agent, or Firm* — Burr & Brown, PLLC (57) ABSTRACT

A storage battery system control method includes at least the following steps. Respective current SOC (state of charge) values of the large capacity storage battery system and the high power storage battery system are acquired. Electrical power, which is required to operate the frequency control service for the purpose of suppressing frequency fluctuations, to the large capacity storage battery system and the high power storage battery system, in accordance with the respective SOC values. The respectively allocated electrical power is charged or discharged by driving the large capacity storage battery system, or alternatively, the high power storage battery system, or alternatively, the large capacity storage battery system and the high power storage battery system.

14 Claims, 7 Drawing Sheets

(56) References Cited

FOREIGN PATENT DOCUMENTS

| | | |
|---|---|---|
| JP | 2014-131369 A1 | 7/2014 |
| JP | 2014-155269 A1 | 8/2014 |
| JP | 2014-529161 A1 | 10/2014 |
| WO | WO2013/103011 A1 | 7/2013 |

* cited by examiner

METHOD FOR CONTROLLING STORAGE BATTERY SYSTEM

CROSS-REFERENCE TO RELATED APPLICATIONS

This application is a Continuation of International Application No. PCT/JP2016/070044 filed on Jul. 6, 2016, which is based upon and claims the benefit of priority from Japanese Patent Application No. 2015-166648 filed on Aug. 26, 2015, the contents all of which are incorporated herein by reference.

BACKGROUND OF THE INVENTION

Field of the Invention

The present invention relates to a storage battery system control method which is suitable for use, for example, in a frequency control. In this instance, the term frequency control refers to various operations utilized in frequency control services including ancillary services and the like for the purpose of suppressing frequency fluctuations in AC electrical power systems, for example. The same understanding applies to the statements given below.

Background Art

A frequency control for suppressing frequency fluctuations in an AC electrical power system is described, for example, in Japanese Laid-Open Patent Publication No. 2012-016077. A frequency control apparatus described in this publication carries out a charging and discharging control of a plurality of secondary batteries, which are connected to an AC electrical power system, in accordance with a demand fluctuation of the AC electrical power system, so that a frequency of the AC electrical power system becomes a reference frequency. In particular, a depth of charge of the secondary battery is corrected in a manner so that the depth of charge of the secondary battery becomes 50%.

SUMMARY OF THE INVENTION

Incidentally, in the case that a frequency control is performed using a plurality of secondary batteries of the same type which are provided, for example, in a large capacity storage battery, then depending on the characteristics of such secondary batteries, and in order to cope with a frequency control in which high power is required, it is necessary to increase the capacity of the storage battery. In that case, a situation is also considered in which economic efficiency is impaired as a result of having an excessive battery capacity in contrast to a required electrical power.

The present invention has been devised taking into consideration such a problem, and has the object of providing a storage battery system control method that exhibits the following effects.

(1) Basically, while having a large capacity, the storage battery system is capable of easily coping with a frequency control in which high power is required, and is capable of providing coverage over a wide range from a short time high power operation to a long time large capacity operation.

(2) A frequency control can be realized which is capable of flexibly dealing with various types of operations.

[1] A storage battery system control method according to the present invention is characterized by including operation utilized in implementing a frequency control service for the purpose of suppressing frequency fluctuations in an AC electrical power system, by combining a large capacity storage battery system which is capable of storing a large amount of electrical power, and a high power storage battery system which is capable of outputting high power in a short time. The operation utilized in implementing the frequency control service includes at least the following steps:

(a) an SOC (state of charge) acquiring step of acquiring respective current SOC values of the large capacity storage battery system and the high power storage battery system;

(b) an electrical power allocating step of allocating electrical power, which is required by the frequency control in order to suppress frequency fluctuations, to the large capacity storage battery system and the high power storage battery system, in accordance with the respective SOC values acquired in the SOC acquiring step; and (c) a storage battery driving step of charging or discharging the respectively allocated electrical power by driving the large capacity storage battery system, or alternatively, the high power storage battery system, or alternatively, the large capacity storage battery system and the high power storage battery system.

[2] In the present invention, in the electrical power allocating step, the electrical power required for the frequency control may be divided in accordance with the respective SOC values acquired in the SOC acquiring step, and may be allocated to the large capacity storage battery system and the high power storage battery system.

[3] In the present invention, if the electrical power required for the frequency control is an electrical power in a discharging direction, then in the electrical power allocating step, the electrical power in the discharging direction may be preferentially allocated to the large capacity storage battery system, and if the electrical power required for the frequency control is an electrical power in a charging direction, then in the electrical power allocating step, the electrical power in the charging direction may be preferentially allocated to the high power storage battery system.

[4] In the present invention, if the electrical power required for the frequency control is insufficient to serve as the electrical power allocated to the large capacity storage battery system, a logic may be provided for increasing an allocation of the high power storage battery system in order to compensate for the insufficiency.

[5] In the present invention, if the electrical power required for the frequency control is an electrical power in a discharging direction, then in the electrical power allocating step, the electrical power in the discharging direction may be preferentially allocated to the storage battery system having a higher SOC value from among the large capacity storage battery system and the high power storage battery system, and if the electrical power required for the frequency control is an electrical power in a charging direction, then in the electrical power allocating step, the electrical power in the charging direction may be preferentially allocated to the storage battery system having a lower SOC value from among the large capacity storage battery system and the high power storage battery system.

[6] In the present invention, there may further be included a depth management step of transferring stored energy of the large capacity storage battery system to the high power storage battery system, and maintaining a depth of the high power storage battery system within an appropriate range.

[7] In the present invention, a plurality of units in which the large capacity storage battery system and the high power storage battery system are combined may be provided, the method may further include a distributed control step of distributing and allocating the electrical power required for the frequency control to two or more of the units, wherein, in the electrical power allocating step of the respective units, the electrical power allocated in the distributed control step may be allocated to the large capacity storage battery system and the high power storage battery system in accordance with the respective SOC values acquired in the SOC acquiring step.

[8] In this case, if the electrical power required for the frequency control is an electrical power in a discharging direction, the electrical power required for the frequency control may be preferentially distributed and allocated to two or more units for which the SOC value of at least the large capacity storage battery system is within an appropriate range, from among the plurality of units.

[9] Furthermore, in the distributed control step, during a period in which at least one unit from among the plurality of units performs a maintenance operation on the large capacity storage battery system, the at least one unit may be excluded from being an electrical power allocation target of the electrical power required for the frequency control. A depth calculation correction process may be cited as an example of the maintenance operation performed with respect to the large capacity storage battery system. The depth calculation correction process is a process of periodically charging or discharging the large capacity storage battery system to reside within a specific depth range, and on the basis of voltage characteristics, correcting a depth calculation parameter of the large capacity storage battery system.

[10] In the invention of item [7], if the electrical power required for the frequency control is an electrical power in a charging direction, the electrical power required for the frequency control may be preferentially distributed and allocated to two or more units for which the SOC value of the high power storage battery system is low, from among the plurality of units.

[11] In this case, in the distributed control step, during a period in which at least one unit from among the plurality of units performs a maintenance operation on the high power storage battery system, the at least one unit may be excluded from being an electrical power allocation target of the electrical power required for the frequency control. A process similar to the above-mentioned depth calculation correction process may be cited as an example of the maintenance operation performed with respect to the high power storage battery system.

[12] In the inventions of any one of items [7] to [11], as a method for realizing a total power adjustment that compensates for maintenance operation periods of the respective units, in allocating electrical power to the two or more units by the distributed control step, at least one of time during which the electrical power is allocated to the respective units and an amplification rate of the electrical power to be allocated may be changed.

[13] In the present invention, there may further be included a plurality of units in which the large capacity storage battery system and the high power storage battery system are combined may be provided, and the method may further include a depth management step of transferring, to a unit in which the SOC value of the large capacity storage battery system is not within an appropriate range from among the plurality of units, stored energy of the large capacity storage battery system in another of the units, to thereby maintain the SOC values of the large capacity storage battery systems of all of the units within an appropriate range.

As has been described above, the storage battery system control method according to the present invention exhibits the following effects.

(1) Basically, while having a large capacity, the storage battery system is capable of easily coping with a frequency control in which high power is required, and is capable of providing coverage over a wide range from a short time high power operation to a long time large capacity operation.

(2) A frequency control can be realized which is capable of flexibly dealing with various types of operations.

DESCRIPTION OF THE PREFERRED EMBODIMENTS

Examples of preferred embodiments of a storage battery system control method according to the present invention will be described below with reference to FIGS. 1 to 7.

Figure 1:
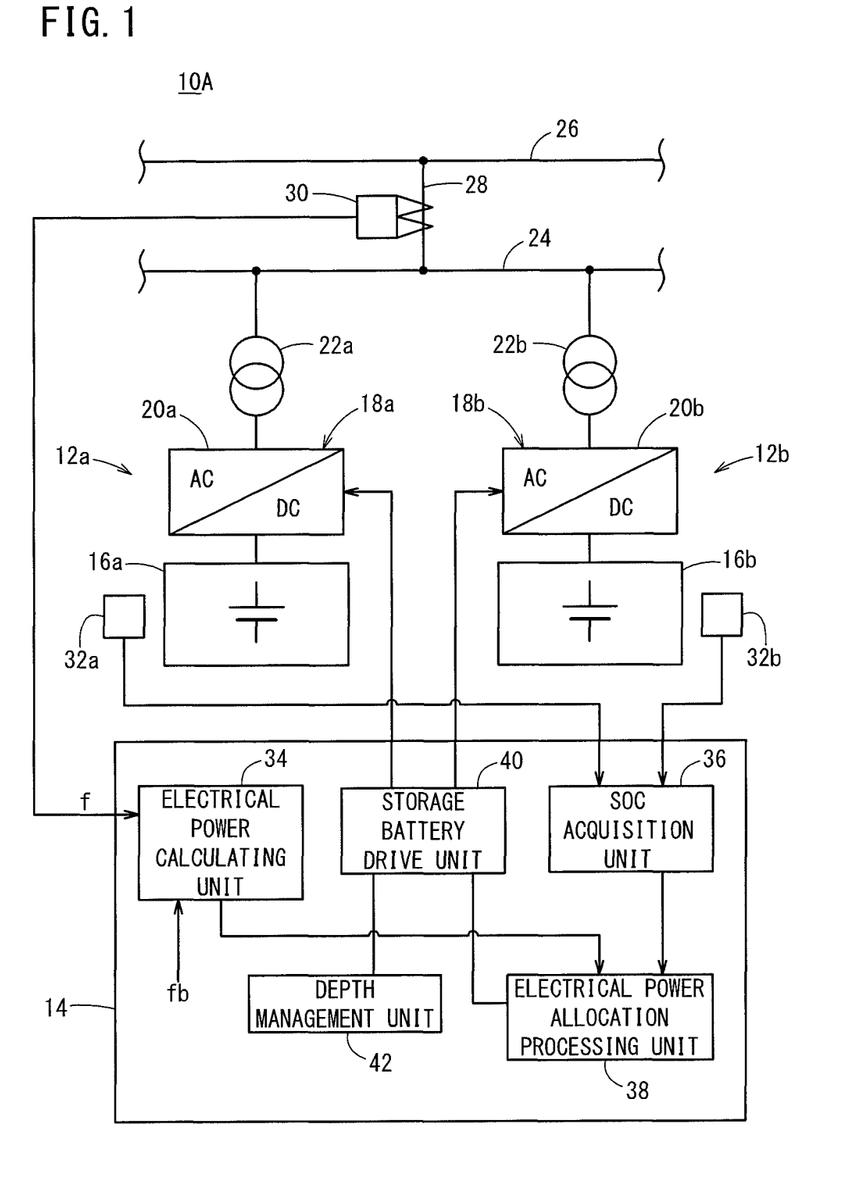
FIG. 1 is a block diagram showing a configuration of a first hybrid storage battery system to which a storage battery system control method (first storage battery system control method) according to a first embodiment is applied.

First, a description will be given of a hybrid storage battery system (hereinafter referred to as a first hybrid storage battery system 10A) to which a storage battery system control method according to a first embodiment (hereinafter referred to as a first storage battery system control method) is applied. As shown in FIG. 1, the first hybrid storage battery system 10A includes a large capacity storage battery system 12a which is capable of storing a large amount of electrical power, a high power storage battery system 12b capable of outputting high electrical power in a short time, and a control device 14 adapted to control the large capacity storage battery system 12a and the high power storage battery system 12b.

The large capacity storage battery system 12a includes a large capacity storage battery 16a and a first PCS (power conversion system) 18a for the large capacity storage battery 16a.

A sodium-sulfur battery (hereinafter referred to as a NaS battery) may be cited as an example of the large capacity storage battery 16a. The first PCS 18a includes a first AC/DC converter 20a, and performs charging and discharging of the large capacity storage battery 16a in accordance with a charge command and a discharge command from the control device 14. The large capacity storage battery 16a is connected to a DC end of the first AC/DC converter 20a in the first PCS 18a. Wiring 24 is connected to an AC end of the first PCS 18a via a first transformer 22a. A bus line 26 of the AC electrical power system is connected to the wiring 24. Further, a frequency measuring device 30, which detects a frequency (system frequency f) of the electrical power flowing through the bus line 26, is installed on a connecting line 28 interconnecting the wiring 24 and the bus line 26.

On the other hand, a high power storage battery system 12b includes a high power storage battery 16b and a second PCS 18b for the high power storage battery 16b. A lithium ion battery may be cited as an example of the high power storage battery 16b. The second PCS 18b includes a second AC/DC converter 20b, and performs charging and discharging of the high power storage battery 16b in accordance with a charge command and a discharge command from the control device 14. The high power storage battery 16b is connected to a DC end of the second AC/DC converter 20b in the second PCS 18b. The wiring 24 is connected to an AC end of the second PCS 18b via a second transformer 22b.

Further, a first depth calculating device 32a, which detects a charge depth (state of charge or SOC value) of the large capacity storage battery 16a, is installed on the large capacity storage battery 16a. A second depth calculating device 32b, which detects a charge depth (state of charge or SOC value) of the high power storage battery 16b, is installed on the high power storage battery 16b. Output values from the first depth calculating device 32a and the second depth calculating device 32b are supplied to the control device 14.

The control device 14 includes an electrical power calculating unit 34, an SOC acquisition unit 36, an electrical power allocation processing unit 38, a storage battery drive unit 40, and a depth management unit 42.

On the basis of a difference between the frequency (system frequency f) measured by the frequency measuring device 30 and a preset reference frequency fb, the electrical power calculating unit 34 calculates the electrical power required by the frequency control in order to suppress frequency fluctuations. In this case, if the system frequency f minus the reference frequency fb is less than 0 (f−fb<0), an electrical power in the positive direction (electrical power in the discharging direction) is calculated, and if the system frequency f minus the reference frequency fb is greater than 0 (f−fb>0), an electrical power in the negative direction (electrical power in the charging direction) is calculated.

On the basis of output values from the first depth calculating device 32a and the second depth calculating device 32b, the SOC acquisition unit 36 acquires the current SOC value of the large capacity storage battery system 12a and the current SOC value of the high power storage battery system 12b.

In accordance with the respective SOC values acquired by the SOC acquisition unit 36, the electrical power allocation processing unit 38 allocates the electrical power obtained by the calculation of the electrical power calculating unit 34 to the large capacity storage battery system 12a and the high power storage battery system 12b.

The storage battery drive unit 40 drives the large capacity storage battery system 12a, or alternatively the high power storage battery system 12b, or alternatively the large capacity storage battery system 12a and the high power storage battery system 12b to thereby charge or discharge the respectively allocated electrical power.

The depth management unit 42 transfers the stored energy of the large capacity storage battery system 12a to the high power storage battery system 12b, and maintains the depth of the high power storage battery system 12b within an appropriate range.

A preferred example of the electrical power allocation method utilized by the electrical power allocation processing unit 38 will now be described.

Allocation of the electrical power is performed in two stages. In the first stage, the electrical power is allocated by any one of three methods, for example. In the second stage, the allocation performed in the first stage is corrected.

First, the three types of allocation methods (first method through third method) performed in the first step will be described.

In the first method, the electrical power required for the frequency control is divided in accordance with the respective SOC values acquired by the SOC acquisition unit 36, and is allocated to the large capacity storage battery system 12a and the high power storage battery system 12b.

More specifically, in the case that the electrical power required for the frequency control is a discharge power Pd, and assuming that the SOC value of the large capacity storage battery system 12a is Sa, whereas the SOC value of the high power storage battery system 12b is Sb, then the electrical power Pda to be allocated to the large capacity storage battery system 12a is given by the following equation $$Pda=Pd \times \{Sa/(Sa+Sb)\}$$

and the electrical power Pdb to be allocated to the high power storage battery system 12b is given by the following equation.

$$Pdb=Pd \times \{Sb/(Sa+Sb)\}$$

Similarly, in the case that the electrical power required for the frequency control is a charging power Pc, then the electrical power Pca to be allocated to the large capacity storage battery system 12a is of a form given by the following equation, in which the depth of charge SOC (Sa, Sb) is converted into a depth of discharge DOD (Da, Db)

$$Pca=Pc \times \{Da/(Da+Db)\}$$

and the electrical power Pcb to be allocated to the high power storage battery system 12b is given by the following equation.

$$Pcb=Pc \times \{Db/(Da+Db)\}$$

Note that in the above equations, Da [%=]=100−Sa [%], and Db [%]=100−Sb [%].

In the second method, in the case that the electrical power required for the frequency control is an electrical power Pd in the discharging direction, the electrical power Pd in the discharging direction is preferentially allocated to the large capacity storage battery system 12a. More specifically, the electrical power Pda allocated to the large capacity storage battery system 12a is set to the electrical power Pd.

Similarly, in the case that the electrical power required for the frequency control is an electrical power Pc in the charging direction, the electrical power Pc in the charging direction is preferentially allocated to the high power storage battery system 12b. More specifically, the electrical power Pca allocated to the high power storage battery system 12b is set to the electrical power Pc.

In the third method, in the case that the electrical power required for the frequency control is an electrical power Pd in the discharging direction, the electrical power Pd in the discharging direction is allocated to the storage battery system for which the SOC value is higher from among the large capacity storage battery system 12a and the high power storage battery system 12b.

Similarly, in the case that the electrical power required for the frequency control is an electrical power Pc in the charging direction, the electrical power Pc in the charging direction is allocated to the storage battery system for which the SOC value is lower from among the large capacity storage battery system 12a and the high power storage battery system 12b.

Next, the second stage of the allocation method carried out in the electrical power allocation processing unit 38 will be described.

First, in the case that the electrical power required for the frequency control is an electrical power Pd in the discharging direction, for example, if the discharge power allocated to the large capacity storage battery system 12a is represented by Pda, the discharge power allocated to the high power storage battery system 12b is represented by Pdb, and the maximum electrical power capable of being discharged from the large capacity storage battery system 12a is represented by Pdm1, then if Pda>Pdm1, Pda is made equal to Pdm1 (Pda=Pdm1). Stated otherwise, the maximum electrical power capable of being discharged Pdm1 is allocated to the large capacity storage battery system 12a.

Further, if the SOC value Sa of the large capacity storage battery system 12a is low, and it is anticipated that the SOC value Sa will lie outside of an allowable range due to discharging of the discharge power Pda, then the discharge power Pda is multiplied by a correction coefficient kd1 (0<kd1<1), and the corrected discharge power is allocated so that the SOC value does not deviate from an appropriate range which is narrower than the aforementioned allowable range.

In this instance, the phrase "if it is anticipated that the SOC value will lie outside of an allowable range" implies, for example, a case in which the current SOC value is within the allowable range, however, the SOC value falls outside of an appropriate range which is narrower than the allowable range.

On the other hand, the discharge power Pdb (=Pd−Pda) is allocated to the high power storage battery system 12b. At this time, in the case that the power Pdb is greater than a maximum electrical power Pdm2 capable of being discharged from the high power storage battery system 12b, then the maximum power capable of being discharged Pdm2 is allocated to the high power storage battery system 12b. Stated otherwise, Pdb is made equal to Pdm2 (Pdb=Pdm2).

Further, if the SOC value Sb of the high power storage battery system 12b is low, and it is anticipated that the SOC value Sb will lie outside of an allowable range due to discharging of the discharge power Pdb, then the discharge power Pdb is multiplied by a correction coefficient kd2 (0<kd2<1), and the corrected discharge power is allocated so that the SOC value does not deviate from an appropriate range. Moreover, if Pd<Pda, discharge power Pdb is made equal to 0 (Pdb=0 W). In this case, discharging of the high power storage battery system 12b is not performed.

Next, in the case that the electrical power required for the frequency control is an electrical power Pc in the charging direction, for example, if the charging power allocated to the large capacity storage battery system 12a is represented by Pca, the charging power allocated to the high power storage battery system 12b is represented by Pcb, and the maximum electrical power capable of being charged to the high power storage battery system 12b is represented by Pcm2, then if Pcb>Pcm2, Pcb is made equal to Pcm2 (Pcb=Pcm2). Stated otherwise, the maximum electrical power capable of being charged Pcm2 is allocated to the high power storage battery system 12b.

Further, if the SOC value Sb of the high power storage battery system 12b is high, and it is anticipated that the SOC value Sb will lie outside of an allowable range due to charging of the charging power Pcb, then the charging power Pcb is multiplied by a correction coefficient kc2 (0<kc2<1), and the corrected charging power is allocated so that the SOC value does not deviate from an appropriate range which is narrower than the allowable range.

On the other hand, the charging power Pca (=Pc−Pcb) is allocated to the large capacity storage battery system 12a. At this time, in the case that the charging power Pca is greater than a maximum electrical power Pcm1 capable of being charged to the large capacity storage battery system 12a, then the maximum power capable of being charged Pcm1 is allocated to the large capacity storage battery system 12a. Stated otherwise, Pca is made equal to Pcm1 (Pca=Pcm1).

Further, if the SOC value Sa of the large capacity storage battery system 12a is high, and it is anticipated that the SOC value Sa will lie outside of an allowable range due to charging of the charging power Pca, then the charging power Pca is multiplied by a correction coefficient kc1 (0<kc1<1), and the corrected charging power is allocated so that the SOC value does not deviate from an appropriate range. Moreover, if Pc<Pcb, charging power Pca is made equal to 0 (Pca=0 W). In this case, charging of the large capacity storage battery system 12a is not performed.

Next, the first storage battery system control method will be described with reference to the flowchart of FIG. 2.

Figure 2:
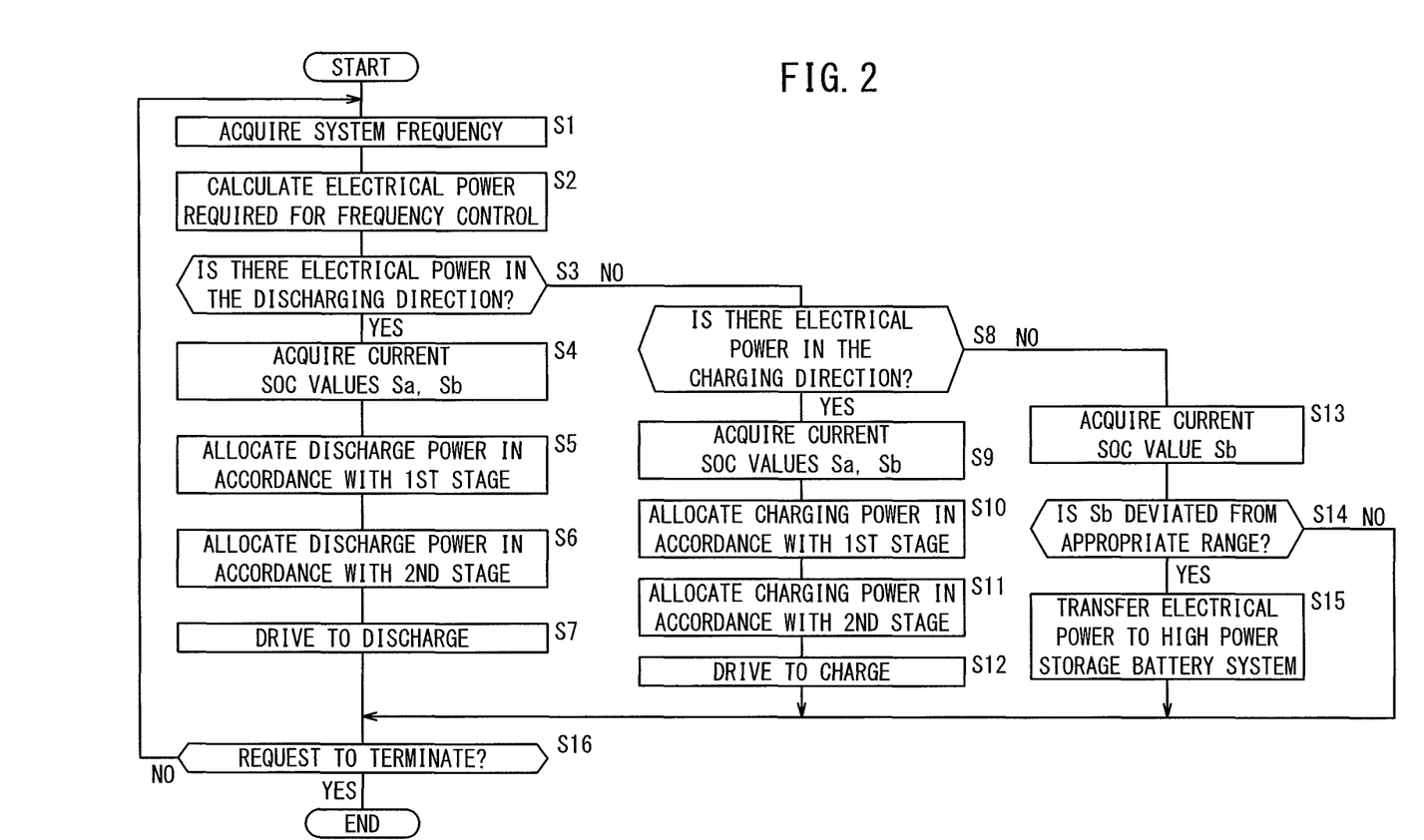
FIG. 2 is a flowchart showing a first storage battery system control method.

First, in step S1 of FIG. 2, the electrical power calculating unit 34 acquires the system frequency f that was measured by the frequency measuring device 30.

In step S2, on the basis of a difference between the system frequency f and the preset reference frequency fb, the electrical power calculating unit 34 calculates the electrical power required by the frequency control in order to suppress frequency fluctuations.

In step S3, the electrical power allocation processing unit 38 determines whether or not the difference between the system frequency f and the reference frequency fb is negative, that is, whether the electrical power required for the frequency control is electrical power in the discharging direction.

If the electrical power is in the discharging direction, the process proceeds to the next step S4, whereupon the SOC acquisition unit 36 acquires the current SOC value Sa of the large capacity storage battery system 12a and the current SOC value Sb of the high power storage battery system 12b.

Thereafter, in step S5, the electrical power allocation processing unit 38 allocates the discharge power Pd in accordance with the aforementioned first stage.

More specifically, in the case that the first method is adopted, the discharge power Pda allocated to the large capacity storage battery system 12a is set to Pd×{Sa/(Sa+Sb)}, and the discharge power Pdb allocated to the high power storage battery system 12b is set to Pd×{Sb/(Sa+Sb)}.

In the case that the second method is adopted, the electrical power Pda allocated to the large capacity storage battery system 12a is set to the electrical power Pd.

In the case that the third method is adopted, the electrical power Pd is allocated to the storage battery system for which the SOC value is higher from among the large capacity storage battery system 12a and the high power storage battery system 12b.

Thereafter, in step S6, the electrical power allocation processing unit 38 carries out the allocation in accordance with the aforementioned second stage.

More specifically, if the discharge power Pda allocated to the large capacity storage battery system 12a is greater than the maximum power capable of being discharged Pdm1 from the large capacity storage battery system 12a (Pda>Pdm1), then Pda is made equal to Pdm1 (Pda=Pdm1) is brought about. Further, in the case it is anticipated that the SOC value Sa will lie outside of an allowable range due to discharging of the discharge power Pda, then the discharge power Pda is multiplied by the correction coefficient kd1 (0<kd1<1), and the corrected discharge power is allocated so that the SOC value does not deviate from the appropriate range.

On the other hand, the discharge power Pdb (=Pd−Pda) is allocated to the high power storage battery system 12b. At this time, in the case that the power Pdb is greater than a maximum electrical power Pdm2 capable of being discharged from the high power storage battery system 12b, then Pdb is made equal to Pdm2 (Pdb=Pdm2) is brought about. Further, in the case it is anticipated that the SOC value Sb will lie outside of an allowable range due to discharging of the discharge power Pdb, then the discharge power Pdb is multiplied by the correction coefficient kd2 (0<kd2<1), and the corrected discharge power is allocated so that the SOC value does not deviate from the appropriate range. Moreover, if Pd<Pda, discharge power Pdb is made equal to 0 (Pdb=W).

Thereafter, in step S7, the storage battery drive unit 40 drives only the large capacity storage battery system 12a, or alternatively the large capacity storage battery system 12a and the high power storage battery system 12b, so as to discharge the power that was respectively allocated thereto.

More specifically, the storage battery drive unit 40 outputs a discharge command with respect to the first PCS 18a. The discharge command includes information concerning the discharge power Pda that was allocated to the large capacity storage battery system 12a. Further, if the discharge power allocated to the high power storage battery system 12b is greater than 0 W, the storage battery drive unit 40 outputs a discharge command to the second PCS 18b. The discharge command includes information concerning the discharge power Pdb that was allocated to the high power storage battery system 12b.

The first PCS 18a discharges the large capacity storage battery 16a on the basis of the discharge command from the storage battery drive unit 40, and outputs electrical power corresponding to the discharge power Pda to the bus line 26. Similarly, in the case that a discharge command is supplied thereto from the storage battery drive unit 40, the second PCS 18b discharges the high power storage battery 16b, and outputs electrical power corresponding to the discharge power Pdb to the bus line 26.

Figure 3A:
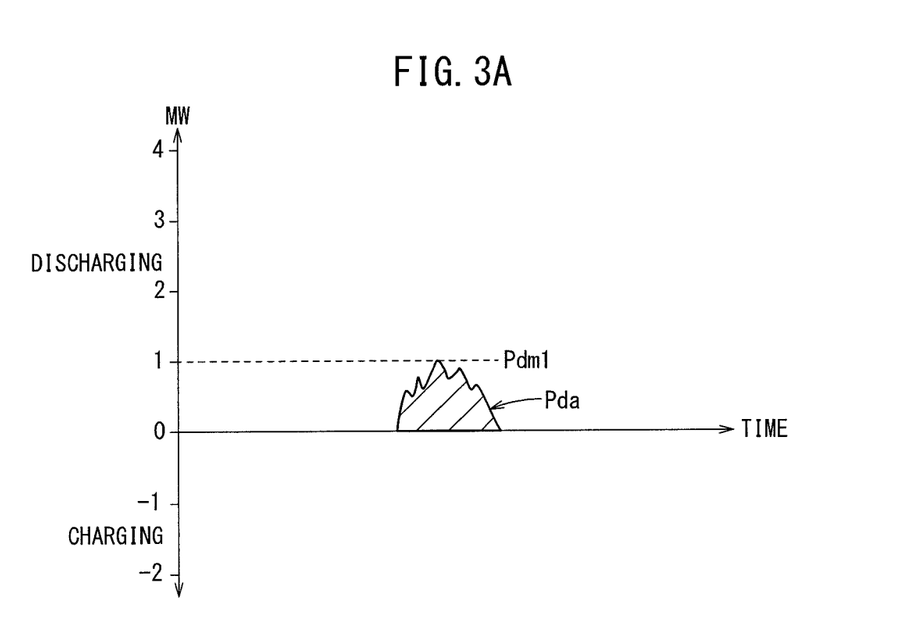
FIG. 3A is a waveform diagram showing an example of a discharge power waveform due to discharging only of a large capacity storage battery system.

Consequently, as shown in FIG. 3A, in the case that the discharge command is output only to the first PCS 18a, only the large capacity storage battery 16a is driven to discharge, and only the discharge power Pda from the large capacity storage battery system 12a is output to the bus line 26 as electrical power in the discharging direction required for the frequency control.

Figure 3B:
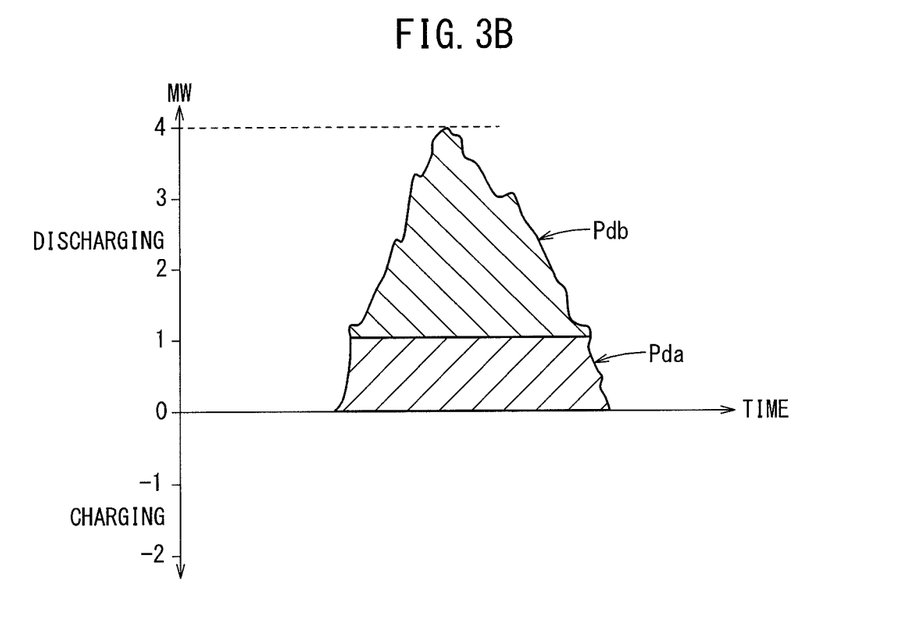
FIG. 3B is a waveform diagram showing an example of a discharge power waveform due to discharging of the large capacity storage battery system and a high power storage battery system.

As shown in FIG. 3B, in the case that the discharge command is output respectively to the first PCS 18a and the second PCS 18b, the large capacity storage battery 16a and the high power storage battery 16b are both driven to discharge, and a discharge power obtained by adding the discharge power Pda from the large capacity storage battery system 12a and the discharge power Pdb from the high power storage battery system 12b is output to the bus line 26 as electrical power in the discharging direction required for the frequency control.

In the above-described step S3, in the case it is determined that the power required for the frequency control is not electrical power in the discharging direction, then the process proceeds to step S8, and the electrical power allocation processing unit 38 determines whether or not the difference between the system frequency f and the reference frequency fb is positive, that is, whether the electrical power required for the frequency control is electrical power in the charging direction.

If the electrical power is in the charging direction, the process proceeds to the next step S9, whereupon the SOC acquisition unit 36 acquires the current SOC value Sa of the large capacity storage battery system 12a and the current SOC value Sb of the high power storage battery system 12b.

Thereafter, in step S10, the electrical power allocation processing unit 38 allocates the charging power Pc in accordance with the aforementioned first stage.

More specifically, in the case that the first method is adopted, the charging power Pca allocated to the large capacity storage battery system 12a is set to Pc×{Da/(Da+Db)}, and the charging power Pcb allocated to the high power storage battery system 12b is set to Pc×{Db/(Da+Db)}.

In the case that the second method is adopted, the electrical power Pcb allocated to the high power storage battery system 12b is set to the electrical power Pc.

In the case that the third method is adopted, the electrical power Pc is allocated to the storage battery system for which the SOC value is lower from among the large capacity storage battery system 12a and the high power storage battery system 12b.

Thereafter, in step S11, the electrical power allocation processing unit 38 carries out the allocation in accordance with the aforementioned second stage.

More specifically, if the charging power Pcb allocated to the high power storage battery system 12b is greater than the maximum electrical power Pcm2 capable of being charged to the high power storage battery system 12b (Pcb>Pcm2), then Pcb is made equal to Pcm2 (Pcb=Pcm2). Further, if the SOC value Sb of the high power storage battery system 12b is high, and it is anticipated that the SOC value Sb will lie outside of an allowable range due to charging of the charging power Pcb, then the charging power Pcb is multiplied by the correction coefficient kc2 (0<kc2<1), and the corrected charging power is allocated so that the SOC value does not deviate from the appropriate range.

On the other hand, the charging power Pca (=Pc−Pcb) is allocated to the large capacity storage battery system 12a. At this time, in the case that the charging power Pca is greater than a maximum electrical power Pcm1 capable of being charged to the large capacity storage battery system 12a, then Pca is made equal to Pcm1 (Pca=Pcm1). Further, if the SOC value Sa of the large capacity storage battery system 12a is high, and it is anticipated that the SOC value Sa will lie outside of an allowable range due to charging of the charging power Pca, then the charging power Pca is multiplied by a correction coefficient kc1 (0<kc1<1), and the corrected charging power is allocated so that the SOC value does not deviate from the appropriate range. Moreover, if Pc<Pcb, charging power Pca is made equal to 0 (Pca=0 W).

Thereafter, in step S12, the storage battery drive unit 40 drives only the high power storage battery system 12*b*, or alternatively the large capacity storage battery system 12*a* and the high power storage battery system 12*b*, so as to charge the power that was respectively allocated thereto.

More specifically, the storage battery drive unit 40 outputs a charge command with respect to the second PCS 18*b*. The charge command includes information concerning the charging power Pcb that was allocated to the high power storage battery system 12*b*. Further, if the charging power allocated to the large capacity storage battery system 12*a* is greater than 0 W, the storage battery drive unit 40 outputs a charge command to the first PCS 18*a*. The charge command includes information concerning the charging power Pca that was allocated to the large capacity storage battery system 12*a*.

The second PCS 18*b* charges the high power storage battery 16*b* on the basis of the charge command from the storage battery drive unit 40, and inputs electrical power corresponding to the charging power Pcb from the bus line 26 to the high power storage battery 16*b*. Similarly, in the case that a charge command is supplied thereto from the storage battery drive unit 40, the first PCS 18*a* charges the large capacity storage battery 16*a*, and inputs electrical power corresponding to the charging power Pca from the bus line 26 to the large capacity storage battery 16*a*.

Figure 4A:
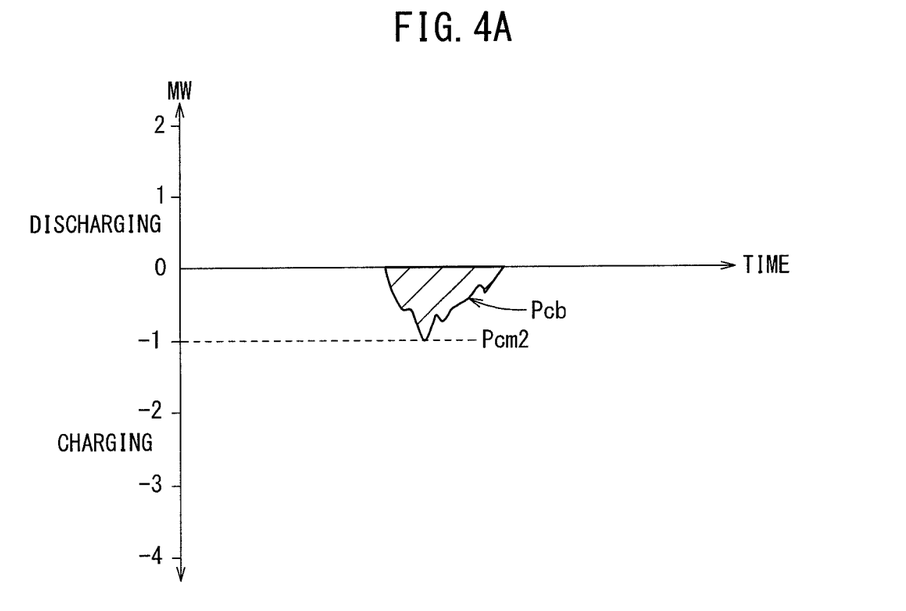
FIG. 4A is a waveform diagram showing an example of a charging power waveform due to charging only of the high power storage battery system.

Consequently, in the case that the charge command is output only to the second PCS 18*b*, only the high power storage battery 16*b* is driven to undergo charging, and as shown in FIG. 4A, only the charging power Pcb is supplied to the high power storage battery 16*b* from the high power storage battery system 12*b* as electrical power in the charging direction required for the frequency control.

Figure 4B:
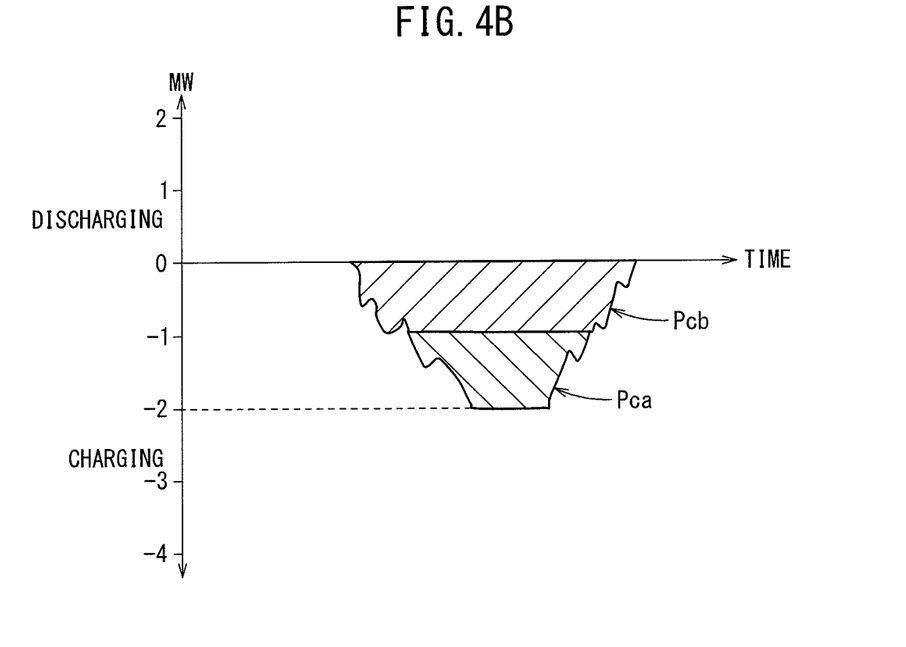
FIG. 4B is a waveform diagram showing an example of a charging power waveform due to charging of the large capacity storage battery system and the high power storage battery system.

As shown in FIG. 4B, in the case that the charge command is output respectively to the first PCS 18*a* and the second PCS 18*b*, the large capacity storage battery 16*a* and the high power storage battery 16*b* are both driven to undergo charging, and the charging power Pca from the large capacity storage battery system 12*a* is supplied to the large capacity storage battery 16*a*, whereas the charging power Pcb from the high power storage battery system 12*b* is supplied to the high power storage battery 16*b* as electrical power in the charging direction required for the frequency control.

In the case it is determined in the above-described step S8 that there is not electrical power in the charging direction, or stated otherwise, if it is determined that the frequency control is not necessary, the process proceeds to step S13, and the SOC acquisition unit 36 acquires the current SOC value Sb of the high power storage battery system 12*b*.

In step S14, the depth management unit 42 determines whether or not the SOC value Sb of the high power storage battery system 12*b* is deviated from the appropriate range.

If the SOC value Sb is determined to be deviated from the appropriate range, the process proceeds to step S15, whereupon the stored energy of the large capacity storage battery system 12*a* is transferred to the high power storage battery system 12*b*, and the depth of the high power storage battery system 12*b* is maintained within the appropriate range. More specifically, for example, a discharge power Pda is obtained so that the SOC value Sa of the large capacity storage battery system 12*a* does not deviate from the appropriate range. In addition, the storage battery drive unit 40 outputs a discharge command to the first PCS 18*a*, and outputs a charge command to the second PCS 18*b*. The discharge command output to the first PCS 18*a* includes information concerning the obtained discharge power Pda, and the charge command output to the second PCS 18*b* includes information concerning the charging power Pcb that is equivalent to the obtained discharge power Pda.

Figure 5:
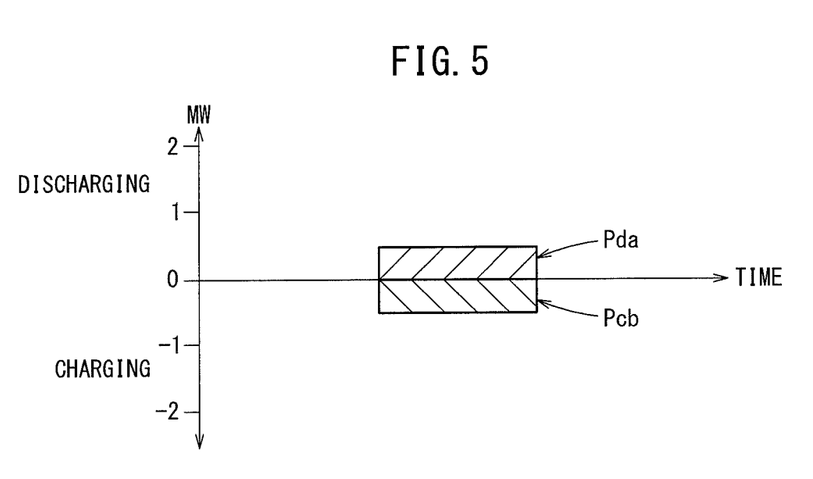
FIG. 5 is a waveform diagram showing an example of an electrical power waveform when a stored energy stored in the large capacity storage battery system is transferred to the high power storage battery system.

In the case that the discharge command is output to the first PCS 18*a* and the charge command is output to the second PCS 18*b*, as shown in FIG. 5, the large capacity storage battery system 12*a* is driven to discharge, whereas the high power storage battery system 12*b* is driven to undergo charging, and the obtained discharge power Pda corresponding to the charging power Pcb is supplied from the large capacity storage battery system 12*a* to the high power storage battery system 12*b*.

At a stage after completion of the process of the above-described step S7, step S12, or step S15, or in the case it is determined that the SOC value Sb does not deviate from the appropriate range in step S14, the process proceeds to the next step S16, whereupon it is determined whether a termination request (a power off request, a maintenance operation request, etc.) has been made with respect to the first hybrid storage battery system 10A. If there is not a termination request, the process returns to step S1, and step S1 and the steps subsequent thereto are repeated. If there is a termination request, the processing operation of the first hybrid storage battery system 10A is brought to an end.

A depth calculation correction process or the like performed with respect to the large capacity storage battery system 12*a* may be cited as an example of the maintenance operation. Such a depth calculation correction process is a process of periodically charging or discharging the large capacity storage battery system 12*a* to reside within a specific depth range, and on the basis of voltage characteristics, correcting a depth calculation parameter of the large capacity storage battery system 12*a*. A similar correction process is also carried out in maintenance preformed with respect to the high power storage battery system 12*b*.

In the foregoing manner, in the first storage battery system control method, at least the following operative effects are achieved.

More specifically, in general, since the large capacity storage battery system 12*a* is incapable of supplying (discharging) electrical power that is equal to or greater than a rated output, it is necessary to increase the storage battery capacity in the event that the large capacity storage battery system 12*a* is used for a frequency control requiring high power. According to the present embodiment, since the high power storage battery system 12*b* is connected in parallel with the large capacity storage battery system 12*a*, a frequency control can be realized which is capable of providing coverage over a wide range from a short time high power operation to a long time large capacity operation, and can flexibly deal with various types of operations.

Although the electrical power required for the frequency control frequently fluctuates in positive and negative directions, even if the amount of charging and discharging of electrical power on the AC side is well balanced, the depth of charge (SOC) of the batteries tends to decrease gradually due to charge and discharge losses within the system. Thus, in the case that the electrical power is output in a positive direction (in the discharging direction of the storage batteries), priority is placed on the output (discharge) from the large capacity storage battery system 12*a*, whereas in the case that the electrical power is output in a negative direction (in the charging direction of the storage batteries), priority is placed on the input (charge) to the high power storage battery system 12b with a low battery capacity. Therefore, even if the positive and negative directions fluctuate frequently, it is possible for the system to operate over a prolonged time period.

Although it is desirable for a depth range of the high power storage battery system 12b to be kept at all times within a range in which outputting is possible both from the aspect of the output and the aspect of the storage capacity thereof in both the positive direction and the negative direction, since the capacity of the high power storage battery system 12b is small, management of the depth is difficult. According to the present embodiment, stored energy from the large capacity storage battery 16a is automatically transferred so as to maintain the depth of the high power storage battery 16b within an appropriate range, and since the depth thereof is appropriately adjusted, it becomes easy to manage the depth of the high power storage battery 16b which heretofore has been difficult.

In accordance with the SOC values Sa, Sb acquired by the SOC acquisition unit 36, the electrical power allocation processing unit 38 allocates the electrical power obtained by the calculation of the electrical power calculating unit 34 to the large capacity storage battery system 12a and the high power storage battery system 12b. Since input and output of the storage batteries is restricted by the SOC status of the storage batteries, by determining the apportionment of the charging and discharging controls on the condition of the SOC status, a charge and discharge control is made possible to properly charge and discharge the large capacity storage battery system 12a and the high power storage battery system 12b.

In the frequency control, a highly rational system can be constructed in which the high power storage battery system 12b is primarily operated in a region that requires high output over a short time period, and the large capacity storage battery system 12a performs input and output of a long time order in units of minutes or more, and can also be used for SOC management of the high power storage battery system 12b.

Next, a description will be given with reference to FIGS. 6 and 7 concerning a hybrid storage battery system (hereinafter referred to as a second hybrid storage battery system 10B) to which a storage battery system control method according to a second embodiment (hereinafter referred to as a second storage battery system control method) is applied.

Figure 6:
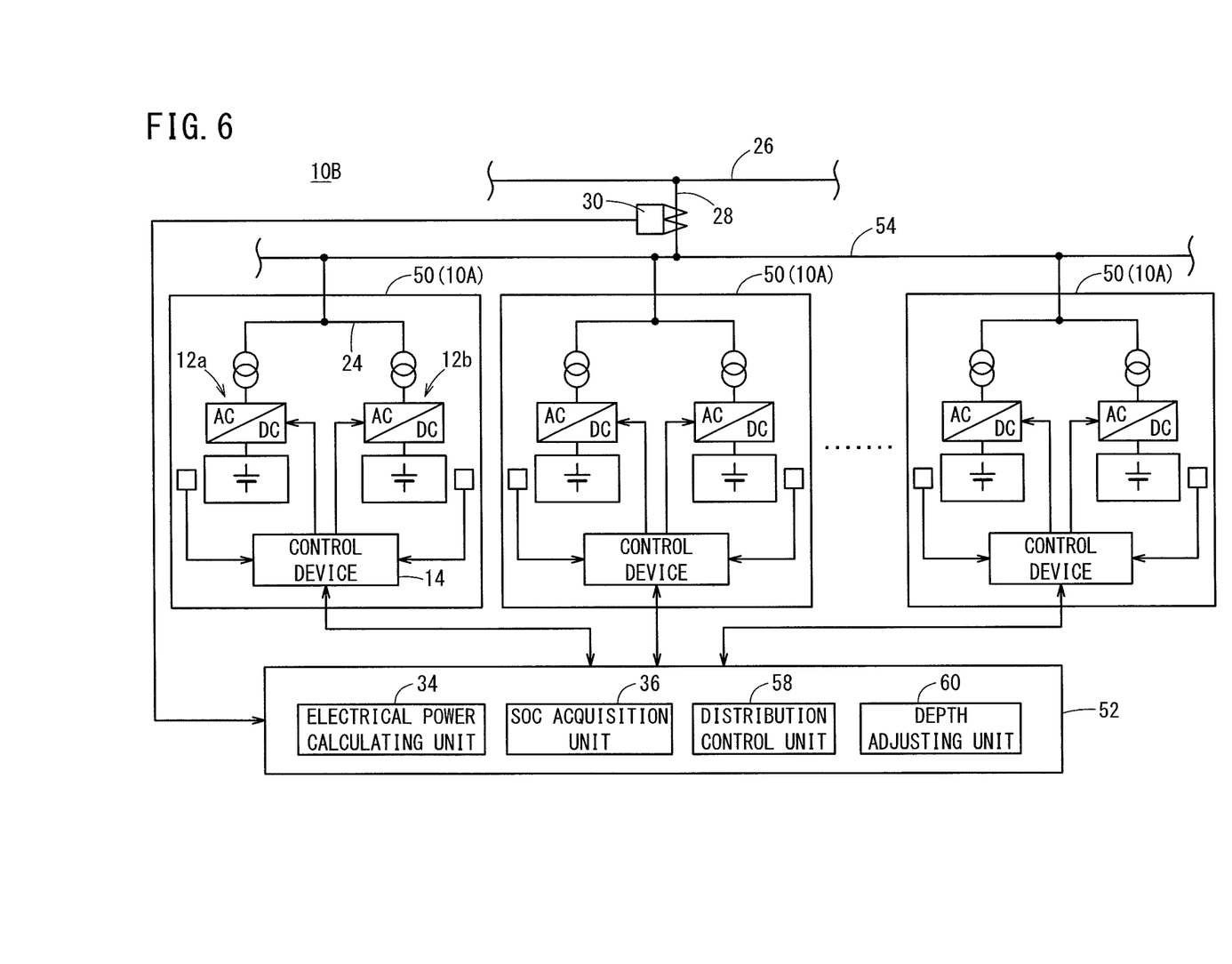
FIG. 6 is a block diagram showing a configuration of a second hybrid storage battery system to which a storage battery system control method (second storage battery system control method) according to a second embodiment is applied.

As shown in FIG. 6, the second hybrid storage battery system 10B includes a plurality of units 50, and a master control device 52 that collectively controls the plurality of units 50. The respective units 50 have configurations that are similar to that of the first hybrid storage battery system 10A. The respective units 50 are connected respectively to a sub-wiring 54. The sub-wiring 54 is connected to the bus line 26 via a connecting line 28. A frequency measuring device 30, which detects the system frequency f of the electrical power flowing through the bus line 26, is installed on the connecting line 28. Further, by the control devices 14 thereof, the respective units 50 each carry out processes that are similar to those of the aforementioned first hybrid storage battery system 10A.

The master control device 52 includes an electrical power calculation unit 34, an SOC acquisition unit 36, a distribution control unit 58 that distributes and allocates the power required for the frequency control to two or more of the units 50, and a depth adjusting unit 60. Accordingly, although not illustrated, instead of the electrical power calculating unit 34, the control device 14 of each of the units 50 has an electrical power acquisition unit (not shown) installed therein, which receives an electrical power (electrical power in the discharging direction or electrical power in the charging direction) which is allocated from the distribution control unit 58 of the master control device 52.

From among the information that is sent thereto from the respective control devices 14 of the plurality of units 50, the SOC acquisition unit 36 acquires the current SOC values Sa of the large capacity storage battery systems 12a and the current SOC values Sb of the high power storage battery systems 12b.

Using at least four techniques, which will be described below, the distribution control unit 58 distributes and allocates the electrical power necessary for the frequency control to two or more of the units 50.

In the first technique, in the case that the electrical power required for the frequency control is an electrical power in a discharging direction, the electrical power required for the frequency control is distributed and allocated to two or more units 50 for which the SOC values Sa of at least the large capacity storage battery systems 12a are within an appropriate range, from among the plurality of units 50. In this case, there is a situation in which the allocation is performed equally with respect to the two or more units 50, and a situation in which the allocation is performed with respect to the two or more units 50, respectively, in accordance with the SOC values Sa of the large capacity storage battery systems 12a thereof. In this instance, the phrase "in accordance with the SOC values" implies that, as the SOC values are higher, the earlier the time of starting discharge becomes, or the greater the amplification rate of the allocated discharge power becomes.

In the second technique, in the case that the electrical power required for the frequency control is an electrical power in a discharging direction, the electrical power required for the frequency control is distributed and allocated during a period in which at least one of the units 50 is carrying out a maintenance operation (the aforementioned depth calculation correction process or the like) on the large capacity storage battery system 12a thereof, and with respect to at least two or more of the units 50, except for the at least one unit 50, for which the SOC values Sa of the large capacity storage battery systems 12a are within an appropriate range, from among the plurality of units 50. In this case as well, there is a situation in which the allocation is performed equally with respect to the two or more units 50, and a situation in which the allocation is performed with respect to the two or more units 50, respectively, in accordance with the SOC values Sa of the large capacity storage battery systems 12a thereof.

In the third technique, in the case that the electrical power required for the frequency control is an electrical power in a charging direction, the electrical power required for the frequency control is distributed and allocated to two or more units 50 for which the SOC values Sb of the high power storage battery systems 12b are low, from among the plurality of units 50. Selection of the two or more units 50 is performed by preferentially selecting units 50 for which the SOC values Sb of the high power storage battery systems 12b are lower than the lower limit of the appropriate range, or units 50 for which the SOC values Sb lie within the appropriate range but are near to the lower limit of the appropriate range.

In this case, there is a situation in which the allocation is performed equally with respect to the two or more units 50, and a situation in which the allocation is performed with respect to the two or more units 50, respectively, in accordance with the SOC values Sb of the high power storage battery systems 12b thereof. In this instance, the phrase "in accordance with the SOC values" implies that, as the SOC values are lower, the earlier the time of starting charging becomes, or the greater the amplification rate of the allocated charging power becomes.

In the fourth technique, in the case that the electrical power required for the frequency control is an electrical power in a charging direction, the electrical power required for the frequency control is distributed and allocated during a period in which at least one of the units 50 is carrying out a maintenance operation on the high power storage battery system 12b thereof, and with respect to at least two or more of the units 50, except for the at least one unit 50, for which the SOC values Sb of the high power storage battery systems 12b are low, from among the plurality of units 50. In this case as well, there is a situation in which the allocation is performed equally with respect to the two or more units 50, and a situation in which the allocation is performed with respect to the two or more units 50, respectively, in accordance with the SOC values Sb of the high power storage battery systems 12b thereof.

From among the plurality of units 50, the depth adjusting unit 60 transfers the stored energy of the large capacity storage battery system 12a in another unit 50 to units 50 in which the SOC values Sa of the large capacity storage battery systems 12a are not within an appropriate range, to thereby maintain the SOC values Sa of the large capacity storage battery systems 12a in all of the units 50 within the appropriate range.

Next, the second storage battery system control method will be described with reference to the flowchart of FIG. 7.

Figure 7:
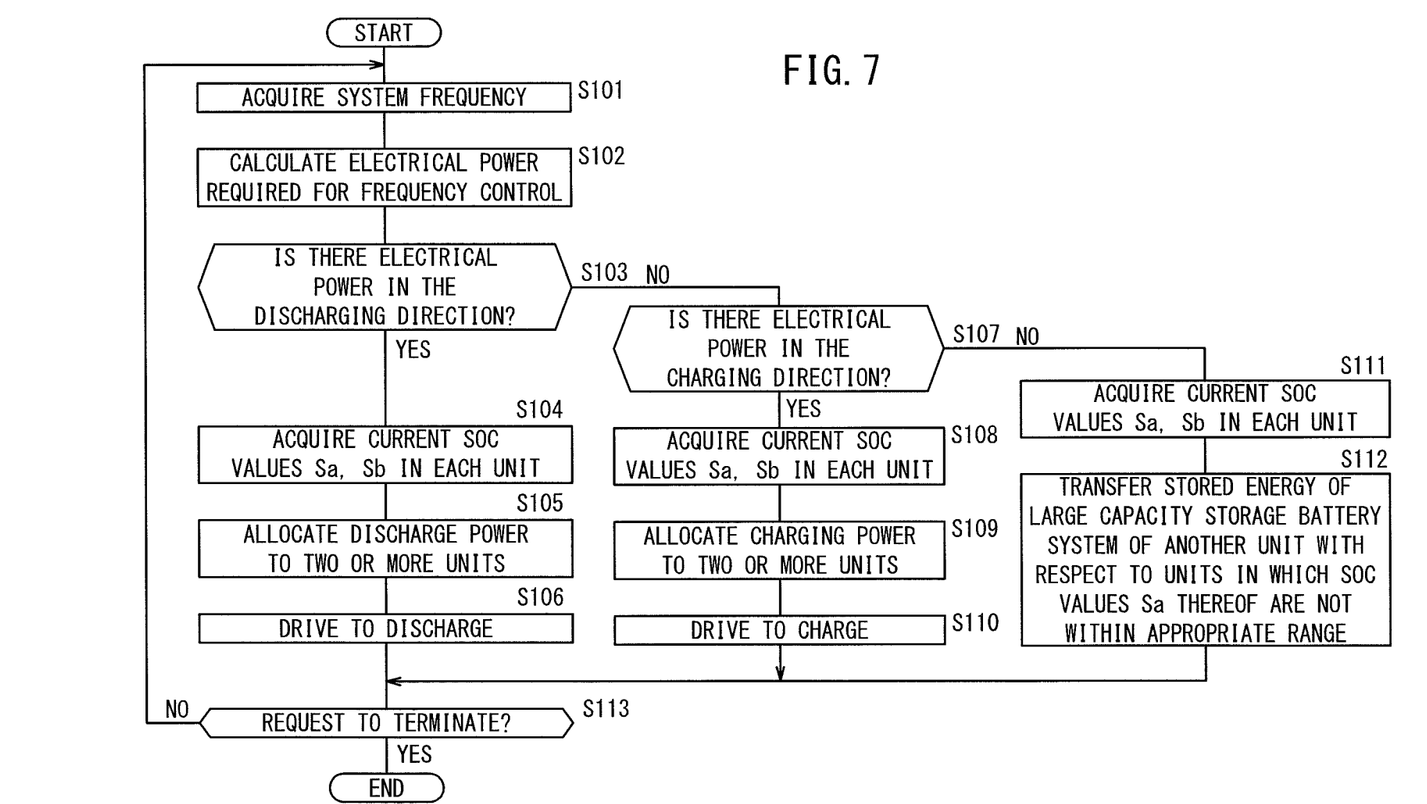
FIG. 7 is a flowchart showing a second storage battery system control method.

First, in step S101 of FIG. 7, the electrical power calculating unit 34 acquires the system frequency f that was measured by the frequency measuring device 30.

In step S102, on the basis of a difference between the system frequency f and the preset reference frequency fb, the electrical power calculating unit 34 calculates the electrical power required by the frequency control in order to suppress frequency fluctuations.

In step S103, the distribution control unit 58 determines whether or not the difference between the system frequency f and the reference frequency fb is negative, that is, whether the electrical power required for the frequency control is electrical power in the discharging direction.

If there is electrical power in the discharging direction, the process proceeds to the next step S104, and from among the information that is sent thereto from the respective control devices 14 of the plurality of units 50, the SOC acquisition unit 36 acquires the current SOC values Sa of the large capacity storage battery systems 12a and the current SOC values Sb of the high power storage battery systems 12b.

Thereafter, in step S105, the distribution control unit 58 distributes and allocates the discharge power necessary for the frequency control to two or more of the units 50, by either one of the first technique and the second technique discussed above.

In the case that the first technique is adopted, the discharge power required for the frequency control is distributed and allocated to two or more units 50 for which the SOC values Sa of at least the large capacity storage battery systems 12a are within the appropriate range, from among the plurality of units 50.

In the case that the second technique is adopted, the discharge power required for the frequency control is distributed and allocated during a period in which at least one of the units 50 is carrying out a maintenance operation on the large capacity storage battery system 12a thereof, and with respect to at least two or more of the units 50, except for the at least one unit 50, for which the SOC values Sa of the large capacity storage battery systems 12a are within the appropriate range, from among the plurality of units 50.

Thereafter, in step S106, the units 50 to which the discharge power is allocated perform processes in accordance with steps S4 to S7 of FIG. 2, and discharging is carried out only with respect to the large capacity storage battery systems 12a thereof, or with respect to the large capacity storage battery systems 12a and the high power storage battery systems 12b thereof. As a result, the discharge powers from the units 50 to which the discharge power is allocated is united by the sub-wiring 54, and an electric power corresponding to the discharge power is supplied to the bus line 26.

In the above-described step S103, in the case it is determined that the power required for the frequency control is not electrical power in the discharging direction, then the process proceeds to step S107, and the distribution control unit 58 determines whether or not the difference between the system frequency f and the reference frequency fb is positive, that is, whether the electrical power required for the frequency control is electrical power in the charging direction.

If there is electrical power in the charging direction, the process proceeds to the next step S108, and from among the information that is sent thereto from the respective control devices 14 of the plurality of units 50, the SOC acquisition unit 36 acquires the current SOC values Sa and the current SOC values Sb.

Thereafter, in step S109, the distribution control unit 58 distributes and allocates the charging power necessary for the frequency control to two or more of the units 50, by either one of the third technique and the fourth technique discussed above.

In the case that the third technique is adopted, the electrical power required for the frequency control is distributed and allocated to the at least two or more units 50 for which the SOC values Sb of the high power storage battery systems 12b are low, from among the plurality of units 50.

In the case that the fourth technique is adopted, the electrical power required for the frequency control is distributed and allocated during a period in which at least one of the units 50 is carrying out a maintenance operation on the high power storage battery system 12b thereof, and with respect to at least two or more of the units 50, except for the at least one unit 50, for which the SOC values Sb of the high power storage battery systems 12b are low, from among the plurality of units 50.

Thereafter, in step S110, the units 50 to which the charging power is allocated perform processes in accordance with steps S9 to S12 of FIG. 2, and charging is carried out only with respect to the high power storage battery systems 12b thereof, or with respect to the large capacity storage battery systems 12a and the high power storage battery systems 12b thereof. As a result, charging power corresponding to the charging power allocated only to the high power storage battery systems 12b, or alternatively, to the large capacity storage battery system 12a and the high power storage battery system 12b of the units 50 to which the charging power was allocated, is supplied.

In the case it is determined in the above-described step S107 that there is not electrical power in the charging direction, or stated otherwise, if it is determined that the frequency control is not necessary, the process proceeds to step S111, and the SOC acquisition unit 36 acquires the current SOC values Sa and the current SOC values Sb from within the information that is sent from the respective control devices 14 of the plurality of units 50.

Therefore, in step S112, from among the plurality of units 50, the depth adjusting unit 60 transfers the stored energy of the large capacity storage battery system 12*a* in another unit 50 to units 50 in which the SOC values Sa of the large capacity storage battery systems 12*a* are not within an appropriate range, to thereby maintain the SOC values Sa of the large capacity storage battery systems 12*a* in all of the units 50 within the appropriate range.

Further, in each of the units 50, in the case it is determined that the frequency control is unnecessary, then similar to step S14 and step S15 of FIG. 2, if the SOC values Sb of the high power storage battery systems 12*b* are determined to be deviated from the appropriate range, the stored energy of the large capacity storage battery systems 12*a* are transferred to the high power storage battery systems 12*b* to thereby maintain the depth of the high power storage battery systems 12*b* within the appropriate range.

At a stage after the processes of the above-described step S106, step S110, or step S112 are completed, the process proceeds to the next step S113, whereupon it is determined whether or not a termination request (a power off request or the like) has been made with respect to the second hybrid storage battery system 10B. If there is not a termination request, the process returns to step S101, and step S101 and the steps subsequent thereto are repeated. If there is a termination request, the processing operation of the second hybrid storage battery system 10B is brought to an end.

In the foregoing manner, in the second storage battery system control method, at least the following operative effects are achieved.

More specifically, the plurality of units 50 in which the large capacity storage battery systems 12*a* and the high power storage battery systems 12*b* are combined are connected together in plurality, and the plurality of units 50 are controlled by the master control device 52. Therefore, on the basis of connection point information of the AC power system (information from the frequency measuring device 30 or the like), a distribution control is enabled for autonomously controlling the respective units 50, and a system with high redundancy can be constructed.

Information on the output state and the state of the storage batteries of each of the units 50 is collected by the master control device 52. Therefore, when some type of restricted state occurs in a certain unit 50, or when it is recognized that such a situation is likely to occur, a method can easily be adopted of mutually correcting the outputs so as to compensate for the restricted state to the extent possible by each of the units 50. This also leads to an increase in redundancy.

Because the plurality of units 50 are installed and mutually controlled, the stored energy of the large capacity storage battery systems 12*a* of each of the units unit 50 can be transferred between the units 50, and more so than in the case of one unit 50 only, it is also possible to keep the depths of the large capacity storage batteries 16*a* within a stable range (appropriate range). More specifically, by acquiring the depth information of each of the large capacity storage batteries 16*a* of the plurality of units 50, and as necessary transferring the storage energy of each of the units 50 little by little, the battery depths of all of the units 50 can be maintained within the appropriate range.

The large capacity storage battery system 12*a* and the high power storage battery system 12*b* are periodically subjected to maintenance operations. In particular, due to the capacity characteristics of the large capacity storage batteries 16*a*, if operations at an intermediate depth are continued over a prolonged period of time, computation errors of the depths are accumulated, and there is a tendency for the error to become large. Therefore, it is preferable to carry out a special operation of periodically charging or discharging to a specific depth region, and performing a process (depth calculation correction process) of correcting a depth calculation parameter of the large capacity storage battery systems 12*a* on the basis of the voltage characteristics thereof. However, large capacity storage battery systems 12*a* which are undergoing such a special operation cannot contribute to the frequency adjusting function. According to the present embodiment, from the fact that a plurality of units 50 are included, even if there is a large capacity storage battery system 12*a* that is performing the aforementioned special operation, it is possible to alleviate the influence thereof.

More specifically, special operations for the depth calculation correction process are performed sequentially, and information concerning the execution timing in each of the units 50 is grasped. In addition, within the period during which a certain one of the units unit 50 is carrying out the special operation for executing the depth calculation correction process, it is possible to prevent the other units 50 from disturbing the special operation. In addition, it is possible to automatically adjust the outputs thereof in a manner so that the amount by which the certain unit 50 cannot contribute to the frequency adjusting function is compensated for to the extent possible by the other units 50.

Periodic maintenance (adjustment operations and the like) is indispensable because measurement errors accumulate and become large due to repeated charging and discharging of the high power storage battery systems 12*b*. In this case as well, within the period in which the high power storage battery system 12*b* of a certain one of the units 50 is carrying out the special operation, it is possible to prevent the other units 50 from disturbing the special operation. In addition, it is possible to automatically adjust the outputs thereof in a manner so that the amount by which the certain unit 50 cannot contribute to the frequency adjusting function is compensated for to the extent possible by the other units 50.

Due to having the plurality of units 50, and by increasing the sensitivity of the units 50 with respect to frequency or the like, it is possible to increase the control speed for suppressing frequency fluctuations.

The storage battery system control method according to the present invention is not limited to the embodiments described above, and it goes without saying that various configurations could be adopted therein without departing from the essence and gist of the present invention. For example, regardless of the means by which the system frequency is measured and the electrical power required for the frequency control is calculated, it also naturally functions effectively as a form of an ancillary service in accordance with charge and discharge commands from the exterior.

What is claimed is:

1. A storage battery system control method including operation utilized in implementing a frequency control service for the purpose of suppressing frequency fluctuations in an AC electrical power system, by combining a large capacity storage battery system which is capable of storing a large amount of electrical power, and a high power storage battery system which is capable of outputting high power;

wherein the operation utilized in implementing the frequency control service includes at least:

an SOC acquiring step of acquiring respective current state of charge values of the large capacity storage battery system and the high power storage battery system;

an electrical power allocating step of allocating electrical power, which is required to operate the frequency control service for suppressing frequency fluctuations, to the large capacity storage battery system and the high power storage battery system, in accordance with the respective SOC values acquired in the SOC acquiring step; and a storage battery driving step of charging or discharging the respectively allocated electrical power by driving the large capacity storage battery system, or alternatively, the high power storage battery system, or alternatively, the large capacity storage battery system and the high power storage battery system, and wherein:

if the electrical power required to operate the frequency control service is an electrical power in a discharging direction, then in the electrical power allocating step, the electrical power in the discharging direction is preferentially allocated to the large capacity storage battery system; and if the electrical power required to operate the frequency control service is an electrical power in a charging direction, then in the electrical power allocating step, the electrical power in the charging direction is preferentially allocated to the high power storage battery system.

2. The storage battery system control method according to claim 1, wherein, in the electrical power allocating step, the electrical power required to operate the frequency control service is divided in accordance with the respective SOC values acquired in the SOC acquiring step, and allocated to the large capacity storage battery system and the high power storage battery system.

3. The storage battery system control method according to claim 1, wherein, if the electrical power required to operate the frequency control service is insufficient to serve as the electrical power allocated to the large capacity storage battery system, a logic is provided for increasing an allocation of the high power storage battery system in order to compensate for the insufficiency.

4. The storage battery system control method according to claim 1, wherein:

if the electrical power required to operate the frequency control service is an electrical power in a discharging direction, then in the electrical power allocating step, the electrical power in the discharging direction is allocated to the storage battery system having a higher SOC value from among the large capacity storage battery system and the high power storage battery system; and if the electrical power required to operate the frequency control service is an electrical power in a charging direction, then in the electrical power allocating step, the electrical power in the charging direction is allocated to the storage battery system having a lower SOC value from among the large capacity storage battery system and the high power storage battery system.

5. The storage battery system control method according to claim 1, further including a depth management step of transferring stored energy of the large capacity storage battery system to the high power storage battery system, and maintaining a depth of the high power storage battery system within an appropriate range.

6. The storage battery system control method according to claim 1, wherein a plurality of units in which the large capacity storage battery system and the high power storage battery system are combined are provided, the method further comprises a distributed control step of distributing and allocating the electrical power required to operate the frequency control service to two or more of the units, and in the electrical power allocating step of the respective units, the electrical power allocated in the distributed control step is allocated to the large capacity storage battery system and the high power storage battery system in accordance with the respective SOC values acquired in the SOC acquiring step.

7. The storage battery system control method according to claim 6, wherein, if the electrical power required to operate the frequency control services is an electrical power in a discharging direction, the electrical power required for the frequency control is distributed and allocated to two or more units for which the SOC value of at least the large capacity storage battery system is within an appropriate range, from among the plurality of units.

8. The storage battery system control method according to claim 7, wherein, in the distributed control step, during a period in which at least one unit from among the plurality of units performs a maintenance operation on the large capacity storage battery system, the at least one unit is excluded from being an electrical power allocation target of the electrical power required to operate the frequency control service.

9. The storage battery system control method according to claim 6, wherein, if the electrical power required to operate the frequency control service is an electrical power in a charging direction, the electrical power required to operate the frequency control service is distributed and allocated to two or more units for which the SOC value of the high power storage battery system is low, from among the plurality of units.

10. The storage battery system control method according to claim 9, wherein, in the distributed control step, during a period in which at least one unit from among the plurality of units performs a maintenance operation on the high power storage battery system, the at least one unit is excluded from being an electrical power allocation target of the electrical power required to operate the frequency control service.

11. The storage battery system control method according to claim 6, wherein, as a method for realizing a total power adjustment that compensates for maintenance operation periods of the respective units, in allocating electrical power to the two or more units by the distributed control step, at least one of time during which the electrical power is allocated to the respective units and an amplification rate of the electrical power to be allocated is changed.

12. The storage battery system control method according to claim 1, wherein a plurality of units in which the large capacity storage battery system and the high power storage battery system are combined are provided, and the method further comprises a depth management step of transferring, to a unit in which the SOC value of the large capacity storage battery system is not within an appropriate range from among the plurality of units, stored energy of the large capacity storage battery system in another of the units, to thereby maintain the SOC values of the large capacity storage battery systems of all of the units within an appropriate range.

13. A storage battery system control method including operation utilized in implementing a frequency control service for the purpose of suppressing frequency fluctuations in an AC electrical power system, by combining a large capacity storage battery system which is capable of storing a large amount of electrical power, and a high power storage battery system which is capable of outputting high power;

wherein the operation utilized in implementing the frequency control service includes at least:

an SOC acquiring step of acquiring respective current state of charge values of the large capacity storage battery system and the high power storage battery system;

an electrical power allocating step of allocating electrical power, which is required to operate the frequency control service for suppressing frequency fluctuations, to the large capacity storage battery system and the high power storage battery system, in accordance with the respective SOC values acquired in the SOC acquiring step; and a storage battery driving step of charging or discharging the respectively allocated electrical power by driving the large capacity storage battery system, or alternatively, the high power storage battery system, or alternatively, the large capacity storage battery system and the high power storage battery system, wherein a plurality of units in which the large capacity storage battery system and the high power storage battery system are combined are provided, the method further comprises a distributed control step of distributing and allocating the electrical power required to operate the frequency control service to two or more of the units, and in the electrical power allocating step of the respective units, the electrical power allocated in the distributed control step is allocated to the large capacity storage battery system and the high power storage battery system in accordance with the respective SOC values acquired in the SOC acquiring step, and wherein, if the electrical power required to operate the frequency control services is an electrical power in a discharging direction, the electrical power required for the frequency control is distributed and allocated to two or more units for which the SOC value of at least the large capacity storage battery system is within an appropriate range, from among the plurality of units.

14. The storage battery system control method according to claim 13, wherein:

if the electrical power required to operate the frequency control service is an electrical power in a discharging direction, then in the electrical power allocating step, the electrical power in the discharging direction is preferentially allocated to the large capacity storage battery system; and if the electrical power required to operate the frequency control service is an electrical power in a charging direction, then in the electrical power allocating step, the electrical power in the charging direction is preferentially allocated to the high power storage battery system.

* * * * *